United States Patent
Wang et al.

(10) Patent No.: US 7,773,632 B2
(45) Date of Patent: Aug. 10, 2010

(54) HEADER COMPRESS/DECOMPRESS FRAMEWORK

(75) Inventors: Edwin Wang, Shanghai (CN); Brett Wang, Shanghai (CN); Young Guo, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 66 days.

(21) Appl. No.: 10/582,528

(22) PCT Filed: Dec. 8, 2005

(86) PCT No.: PCT/CN2005/002133

§ 371 (c)(1),
(2), (4) Date: Jun. 9, 2006

(87) PCT Pub. No.: WO2007/065300

PCT Pub. Date: Jun. 14, 2007

(65) Prior Publication Data

US 2009/0147804 A1 Jun. 11, 2009

(51) Int. Cl.
*H04L 12/56* (2006.01)
*G06F 15/16* (2006.01)
(52) U.S. Cl. ............ 370/476; 370/389; 370/392; 370/521
(58) Field of Classification Search ......... 370/335–392, 370/400–477, 521, 252, 329; 375/219, 240; 348/384.1; 455/72; 709/247
See application file for complete search history.

(56) References Cited

U.S. PATENT DOCUMENTS

| 2003/0005122 | A1 | 1/2003 | Freimuth et al. |
| 2005/0100051 | A1* | 5/2005 | Kim et al. .............. 370/477 |
| 2007/0206621 | A1* | 9/2007 | Plamondon et al. ......... 370/413 |

FOREIGN PATENT DOCUMENTS

| CN | 1357189 A | 7/2002 |
| CN | 1408189 A | 4/2003 |
| CN | 1602616 A | 3/2005 |
| WO | WO-2007/065300 A1 | 6/2007 |

OTHER PUBLICATIONS

Chinese Office Action, Aug. 14, 2009, 9 pages, Application No. 200580052231.6.
Ellen Moyse, International Preliminary Report on Patentability, Jun. 11, 2008, 4 pages, PCT/CN2005/002133, Patent Cooperation Treaty, Geneva, Switzerland.
Written Opinion of the International Searching Authority, Jun. 15, 2006, 3 pages, PCT/CN2005/002133, Patent Cooperation Treaty, Beijing, China.

* cited by examiner

*Primary Examiner*—Afsar M. Qureshi
(74) *Attorney, Agent, or Firm*—Blakely, Sokoloff, Taylor & Zafman LLP

(57) ABSTRACT

Machine-readable media, methods, and apparatus are described. In some embodiments, a header policy for a packet to be transmitted through the network is defined based upon characteristics of the network and a header of the packet is compressed based upon whether the header policy indicates the header of the packet is to be compressed.

27 Claims, 4 Drawing Sheets

HEADER COMPRESS/DECOMPRESS FRAMEWORK

CROSS-REFERENCE TO RELATED APPLICATION

This application is a National Phase application of, and claims priority to, International Application No. PCT/CN2005/002133, filed Dec. 8, 2005, entitled "A HEADER COMPRESS/DECOMPRESS FRAMEWORK".

BACKGROUND

Various header compression mechanisms to reduce header overhead of packets transmitted over a network (e.g., Internet) have been introduced in recent years. For example, header compressions under compressed transfer control protocol (CTCP), compressed real time transport protocol (CRTP) and robust header compression (ROHC) have been widely used, especially, in voice over internet protocol (VoIP) applications. However, those header compression mechanisms are designed for specific networks or traditional usage models, regardless of changeable network environment, different types of the packets, user's preference for header compression and the like. Same situations exist in header decompression for the packets received through the network.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques for header compression/decompression method and apparatus. In the following description, numerous specific details such as logic implementations, pseudo-code, means to specify operands, resource partitioning/sharing/duplication implementations, types and interrelationships of system components, and logic partitioning/integration choices are set forth in order to provide a more thorough understanding of the current invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, that may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.) and others.

Figure 1:
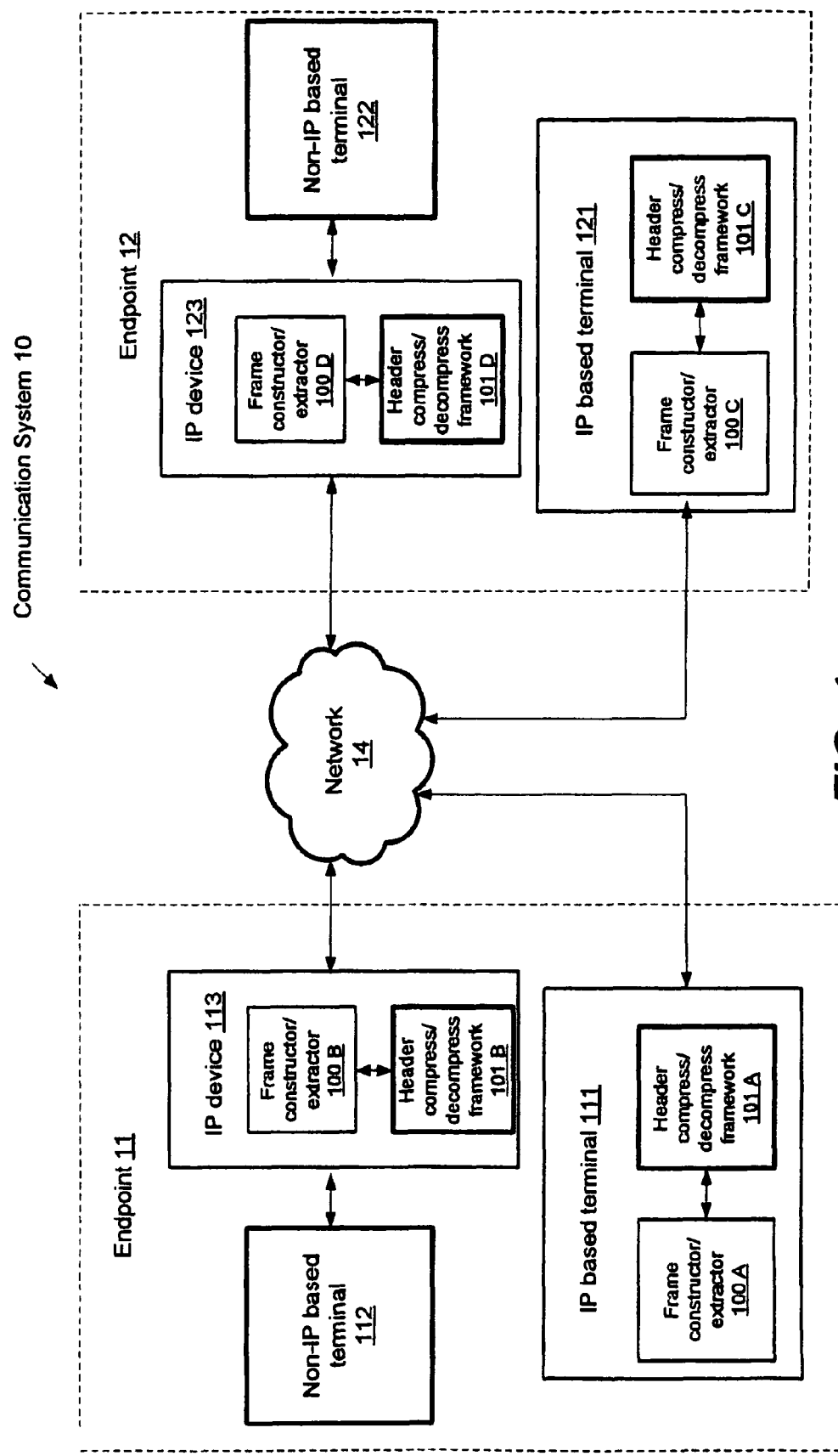
FIG. 1 shows an embodiment of a communication system comprising a header compress/decompress framework.

An embodiment of a communication system 10 comprising a header compress/decompress framework is shown in FIG. 1. The communication system 10 may comprise endpoints 11 and 12 that may communicate through an IP based network 14, such as Internet or private LAN. Each endpoint 11/12 may further comprise various types of terminals, such as IP based terminals 111/121 for communication through the network 14 with IP packet coding/decoding implemented by itself, or non-IP based terminals 112/122 for communication through the network 14 with IP packet coding/decoding implemented by an IP device 113/123. Examples for the IP based terminals 111/121 may comprise IP phone, IP fax machine, personal digital assistant (PDA), mainframe computer, mini-computer, personal computer, portable computer, laptop computer and other devices for transceiving and processing IP packets, etc. Examples for the non-IP based terminals may comprise conventional telephone, fax machine, cell phone, and other devices for transceiving and processing non-IP packets, etc. The conventional telephone and fax machine may further link with the IP device 113/123 through a public switched telephone network (PSTN), and the cell phone may further link with the IP device 113/123 through a wireless network. Each terminal in the endpoint 11 may be of bidirectional communication with any terminal in the endpoint 12 through audio, video and data.

The IP device 113/123 may enable the bidirectional communication for the non-IP based terminals 112/122 by coding audio, video and data samples received from the non-IP based terminals 112/122 into IP packets to be transmitted through the network 14 or decoding IP packets received through the network 14 into the audio, video and data samples to be transmitted to the non-IP based terminals 112/122. Examples for the IP device 113/123 may comprise a gateway, modem, etc.

In accordance with the embodiment, the IP based terminal 111/121 and the IP device 113/123 may respectively comprise a frame constructor/extractor 100A, 100B, 100C and 100D to construct audio, video and data frames into IP packets or extract audio, video and data frames from the IP packets, and a header compress/decompress framework 101A, 101B, 101C and 101D coupled between the frame constructor/extractor 100 and the network 14 to make a header policy based upon various factors and compress or decompress headers of the IP packets received from the frame constructor/extractor or from the network based upon the header policy. Many factors may influence the policy making and thus change the header compression/decompression process, such as network environment, types of the IP packets, user preferences on header compression/decompression, predefined rules on header compression/decompression, and so on.

The header policy may determine whether or not to compress/decompress a header of an IP packet input to the framework 101. The header policy may further adjust an existing header compression/decompression mechanism that the framework 101 may adopt to compress/decompress the IP packet headers, such as how many IP packets with static header fields should be send out before starting the header compression, how to compress 'predictable' header fields, and the like. The header policy may further determine how to process the IP packet after header compression/decompression, for example, whether to discard the IP packet.

Figure 2:
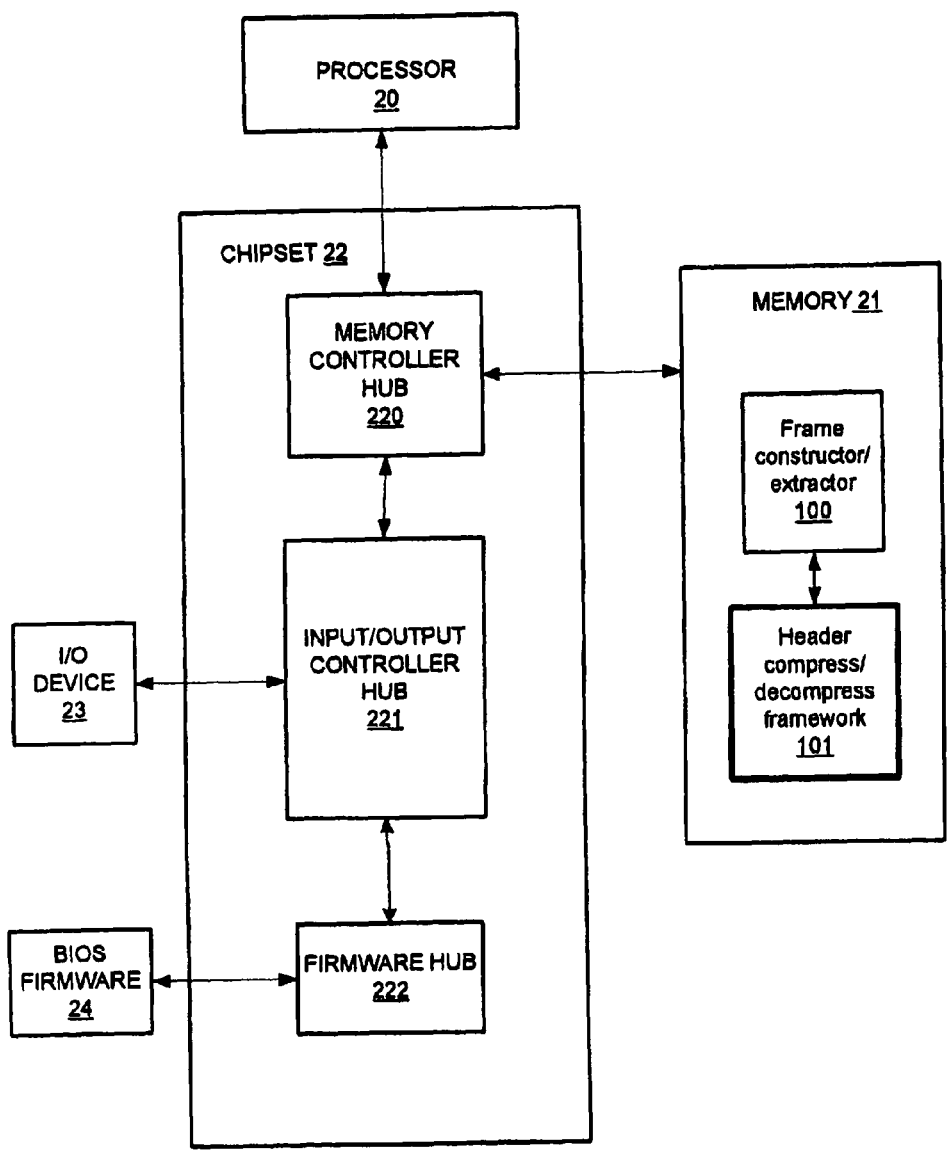
FIG. 2 shows an embodiment of an internet protocol (IP) based terminal or IP device having the header compress/decompress framework in the communication system of FIG. 1.

FIG. 2 depicts an embodiment of the IP based terminals 111/121 or IP device 113/123 in FIG. 1.

In accordance with the embodiment, the IP based terminals 111/121 or IP device 113/123 may comprise one or more processors 20, memory 21, chipset 22, I/O device 23, BIOS firmware 24 and the like. The one or more processors 20 are communicatively coupled to various components (e.g., the memory 21) via one or more buses such as a processor bus. The processors 20 may be implemented as an integrated circuit (IC) with one or more processing cores that may execute codes under a suitable architecture, for example, including Intel® Pentium™, Intel® XScale™ architectures, available from Intel Corporation of Santa Clara, Calif.

In an embodiment, the memory 21 may store codes to be executed by the processor 20. A non-exhaustive list of examples for the memory 21 may comprise one or a combination of the following semiconductor devices, such as synchronous dynamic random access memory (SDRAM) devices, RAMBUS dynamic random access memory (RDRAM) devices, double data rate (DDR) memory devices, static random access memory (SRAM), flash memory devices, and the like.

In an embodiment, the chipset 22 may provide one or more communicative path among the processor 20, memory 21 and various components, such as the I/O device 23 and BIOS firmware 24. The chipset 22 may comprise a memory controller hub 220, an input/output controller hub 221 and a firmware hub 222.

In an embodiments the memory controller hub 220 may provide a communication link to the processor bus that may connect with the processor 20 and to a suitable device such as the memory 21. The memory controller hub 220 may couple with the I/O controller hub 221 that may provide an interface to the I/O devices 23. A non-exhaustive list of examples for the I/O devices 23 of the IP based terminals 111/121 may comprise a network card connecting to the network 14, audio device and audio controller to capture/display audio samples, graphic device and graphic controller to capture/display video samples, etc. A non-exhaustive list of examples for the I/O devices 23 of the IP device 113/123 may comprise a network card connecting to the network 14, an interface connecting to the non-IP based terminal 112/122 such as a fixed phone line connecting to the conventional telephone or fax machine, a D/A converter to convert analogue signals received from the non-IP based terminal 112/122 into digital signals to be transmitted over the network 14 or convert the digital signals received through the network 14 into the analogue signals to be transmitted to the non-IP based terminal 112/122, and so on.

In an embodiment, the memory controller hub 220 may communicatively couple with a firmware hub 222 via the input/output controller hub 221. The firmware hub 222 may couple with the BIOS firmware 24 that may store routines that the computing platform executes during system startup in order to initialize the processors 20, chipset 22, and other components of the IP based platform or IP device.

In the embodiment as depicted in FIG. 2, the memory 21 may further store software images as the frame constructor/extractor 100 and the header compress/decompress framework 101.

Figure 3:
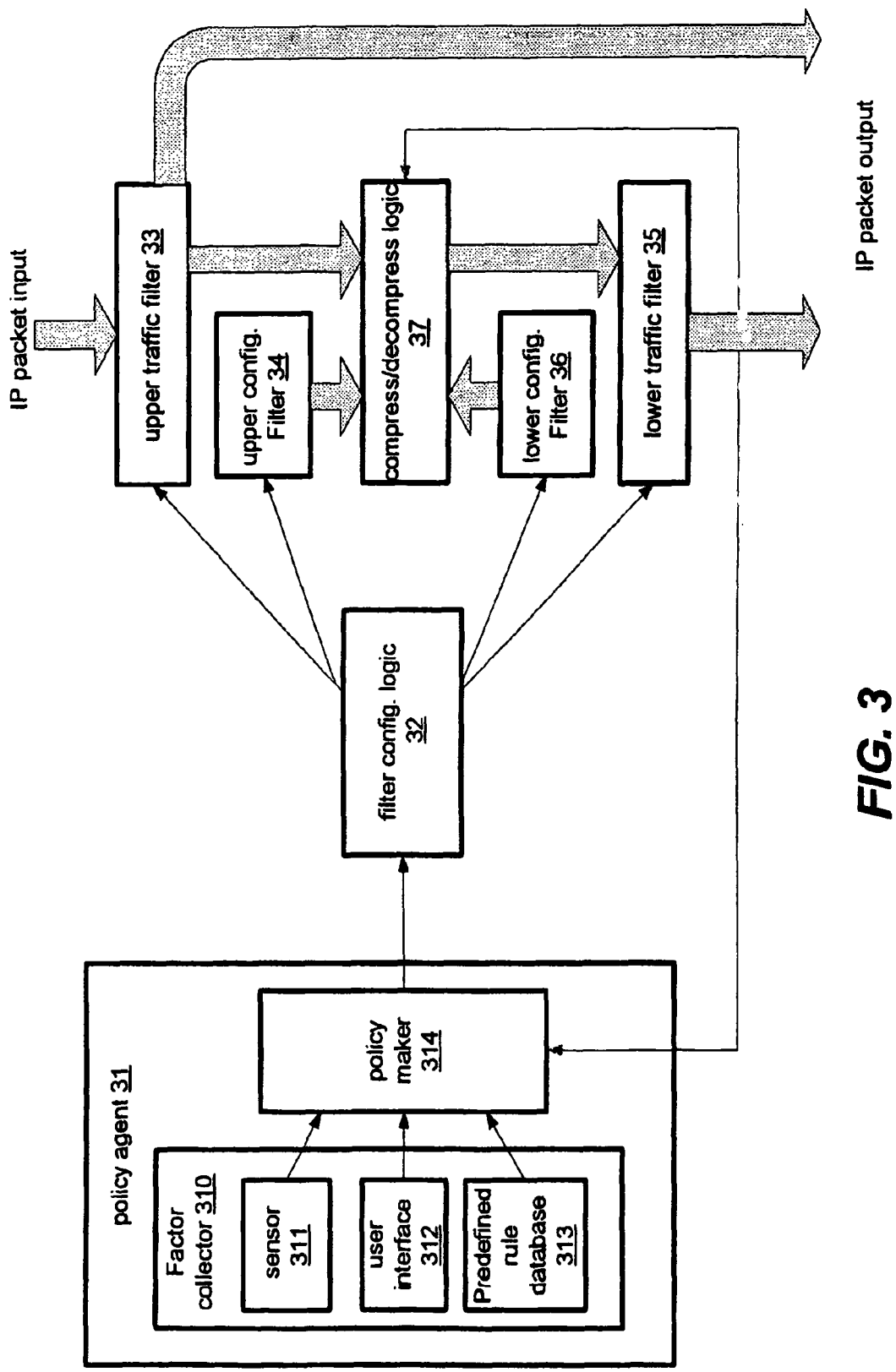
FIG. 3 shows an embodiment of the header compress/decompress framework of FIG. 1.

FIG. 3 depicts an embodiment of the header compress/decompress framework 101 in FIG. 1.

In accordance with the embodiment, the header compress/decompress framework 101 may comprise a policy agent 31, a filter configuration logic 32, an upper traffic filter 33, an upper configuration filter 34, a lower traffic filter 35, a lower configuration filter 36 and a compress/decompress logic 37.

The policy agent 31 may make a header policy base upon various factors, such as characteristics of the network and/or IP packets, user's preference for header compression/decompression, predefined rules on header compression/decompression, feedback on header compression/decompression for previous IP packets, etc. The policy agent may further comprise a factor collector 310 to collect the factors that may influence the policy making, and a policy maker 314 to make a header policy based upon the collected factors. The factor collector 310 may further comprise a sensor 311 to sense the characteristics of the network and/or IP packets, a user interface 312 to interact with a user of the IP based terminals 111/121 or non-IP based terminals 112/122 and collect user's preference for header compression/decompression and a predefined rule database 313 setup during a configuration phase of the header compress/decompress framework 101 to store predefined rules on header compression/decompression.

The sensor 311 may sense the characteristics of the network and/or IP packets including, but not limited to, network type, bandwidth, transmission speed, type of a network device that may route the IP packets output from the header compress/decompress framework 101, type of IP packets, etc. For example, the sensor 311 may sense whether the network is a fixed wired network (e.g., 802.3 based wired Ethernet) or a wireless network (e.g., 802.11 based WiFi connection) as well as the bandwidth and/or transmission speed, so as to help the policy maker 314 determine whether the network is stable and high speed or unstable and low speed. For another example, the sensor 311 may sense whether the network device routing the IP packets output from the header compress/decompress framework 101 is aware of header compression and/or type of the IP packets (e.g., audio packets or video packet) so as to help the policy maker 314 determine whether the header compression is necessary.

The user interface 312 may provide a graphic interface to interact with user of the IP based terminals 111/121 or non-IP based terminals 112/122 and collect user's preference for header compression/decompression so as to help the policy maker 314 make a corresponding header policy. For example, the user interface 312 may collect information on whether or not the user prefers headers of specific IP packets (e.g., the IP packets from/to a specific caller/recipient or transceived in a specific period of time) to be compressed or decompressed. The user interface 312 may further collect information on how the user prefers the headers of the IP packets to be compressed or decompressed, e.g., proactive compression/decompression or modest compression/decompression. However, other embodiments may implement other modifications and variations on the user interface 312. For example, the user interface 312 may collect information other than stated above, such as whether the user prefers to receive or transmit audio, video or data samples from/to a specific caller/recipient or in a specific period of time with high quality and speed. Then, the policy maker 314 may translate the information into a corresponding header policy.

The predefined rule database 313 may store predefined rules on header compression/decompression setup during the configuration phase of the header compress/decompress framework 101. For example, a company owning the IP device 113/123 may setup the predefined rule database and predefine whether and how to compress or decompress the IP packets transmitted from/to the company.

The policy maker 314 may make a header policy based upon the various factors collected by the collector 310. The header policy may determine whether or not headers of IP packets input to the header compress/decompress framework 101 should be compressed/decompressed. The header policy may further determine a manner to compress/decompress the headers of the IP packets, e.g., a proactive or modest compression/decompression. For example, the policy maker may make a header non-compression/decompression policy for specific IP packets (e.g., IP packets from/to a specific caller/recipient or transceived in a specific period of time) if the sensor 311 senses the network is a wireless and low speed network, or the IP packets are video packets, or any network device that may route the IP packets is unaware of compressed headers, which makes the header compression/decompression meaningless; or if the user interface 312 shows the user prefers the headers of the specific IP packets uncompressed or un-decompressed; or if the predefined rule database 313 says so. For another example, the policy maker 314 may make a proactive header compression/decompression policy for the specific IP packets if the sensor 311 senses the network is a fixed wired and high speed network, or the IP packets are audio packets having redundant information in the header fields; or if the user interface 312 shows the user prefers a proactive header compression/decompression policy; or if the predefined rule database 313 says so. For still another example, the policy maker 314 may make a modest header compression/decompression policy for the specific IP packets if the sensor 311 senses the network is a low speed network but the IP packets are header overloaded which may worsen the packets transmission; or if the user interface 312 shows the user prefers a modest header compression/decompression policy; or if the predefined rule database 313 says so.

The policy maker 314 may further adjust a header policy based upon feedback from the compress/decompress logic 37 indicating how the header compression/decompression goes on for previous IP packets.

The policy maker 314 may further translate the header policy into parameters to help the filter configuration logic 32 configure corresponding filter(s), such as upper traffic filter 33, upper configuration filter 34, lower traffic filter 35 or lower configuration filter 36. The parameters may comprise traffic parameters and compression/decompression parameters. The traffic parameters may help the upper traffic filter 33 to determine whether to deliver the IP packets to the compress/decompress logic 37 for header compression/decompression, or output the IP packets without header compression/decompression, or help the lower traffic filter 35 to determine whether to discard or output the IP packets from the compress/decompress logic. The compression/decompression parameters may help the compress/decompress logic 37 to compress or decompress the IP packets delivered from the upper traffic filter 33 in a manner specified by the header policy, such as proactively or modestly, and may be delivered to the compress/decompress logic 37 through the upper configuration filter 34 and/or lower configuration filter 36.

The compress/decompress logic 37 may compress/decompress the IP packets not only based upon an existing compression/decompression mechanism such as CTCP, CRTP, ROHC, etc., but also base upon the compression/decompression parameters. The existing compression/decompression mechanism may take advantage of the fact that it is not necessary to send static header fields in every packet because they do not change during a session, and the so-called 'changing fields' can be predicted from previous packets using a simple linear extrapolation, to perform the header compression/decompression. The compression/decompression parameters may reflect the header policy by, for example, determining how many IP packets with full header fields (i.e., uncompressed header fields) may be transmitted first and then start the header compression to trim the redundant header fields, or determining how to interpret the predictable 'changing fields'.

Other embodiments may implement other modifications and variations on the structure of the header compress/decompress framework as depicted in FIG. 3. For example, the factor collector 310 may comprise one or more of the sensor 311, user interface 312, predefined rule database 313. For another example, the policy maker can make policies other than the header policy, such as packet encryption/decryption policy, packet signature policy, etc. For still another example, based upon the header policy, the filter configuration logic 32 may configure any number of the upper traffic filter 33, upper configuration filter 34, lower traffic filter 35 and lower configuration filter 36. More specifically, the upper configuration filter 34 and/or lower configuration filter 36 may be omitted if the policy maker send the compression/decompression parameters directly to the compress/decompress logic or if no compression/decompression parameters are generated. The upper traffic filter 33 and/or lower traffic filter 34 may be omitted if no traffic parameters are generated.

Figure 4:
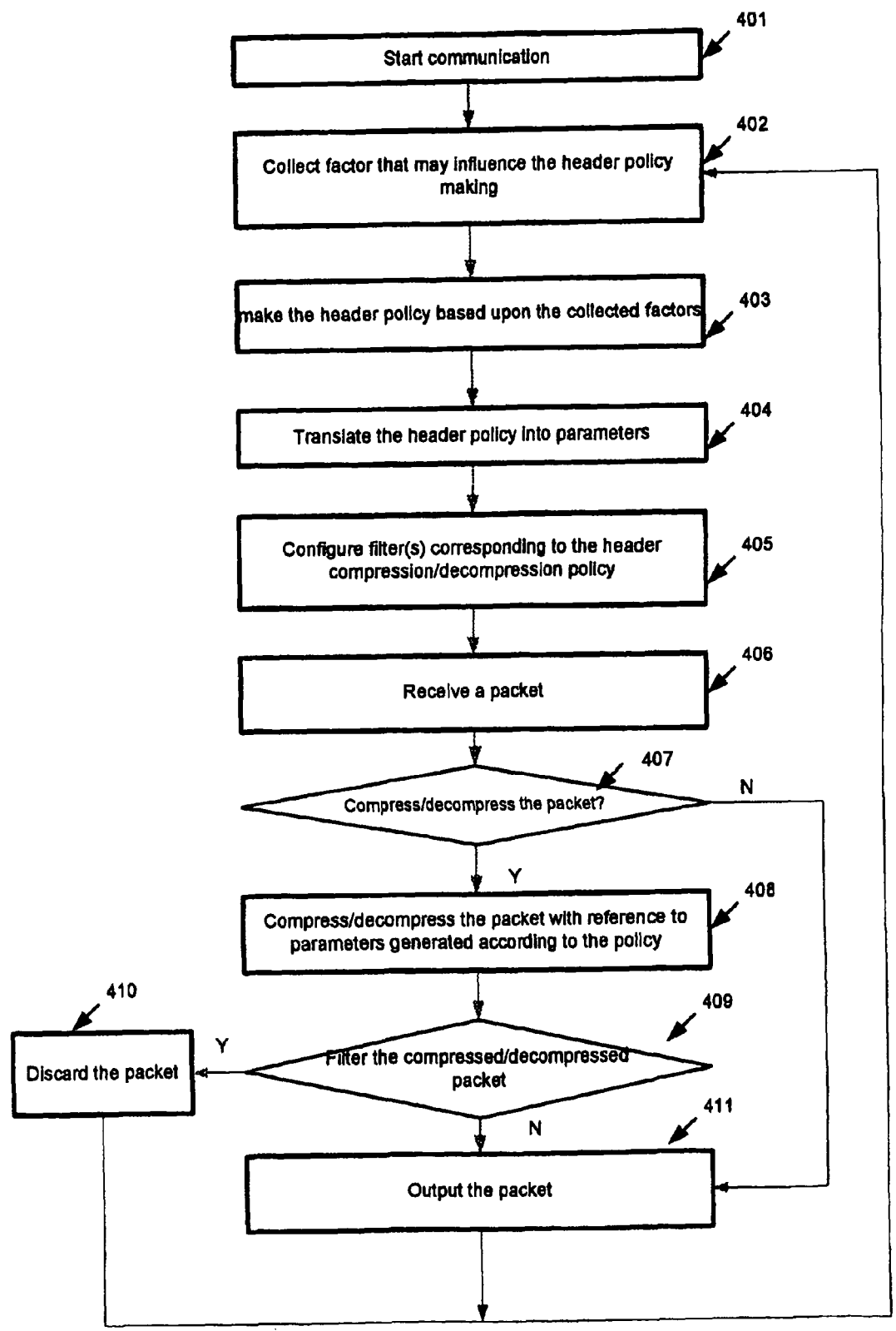
FIG. 4 shows an embodiment of a header compression/decompression method implemented by the header compress/decompress framework of FIG. 3.

An embodiment of a header compression/decompression method implemented by the header compress/decompress framework 101 is depicted in FIG. 4.

In block 401, two terminals in the two endpoints 11 and 12 may start audio, video or data communication with each other. In block 402, the factor collector 310 of the header compress/decompress framework 101 in one terminal may collect factor(s) that may influence the header policy, for example, through sensing the characteristics of the network 14 and/or IP packets, interacting with the terminal user, checking the predefined rule database, detecting feedback of the compress/decompress logic 37, etc. Then, in block 403, the policy maker 314 may dynamically make a header policy based upon the collected factors. For example, the header policy may determine whether and how to compress/decompress headers of IP packets input to the header compress/decompress framework 101. The header policy may further determine how to process the IP packets after header compression/decompression.

In block 404, the policy maker 31 or filter configuration logic 32 may translate the header policy into parameters that the filters or compress/decompress logic may rely on for implementation, for example, the traffic parameters or compression/decompression parameters. In block 405, the filter configuration logic 32 may configure any number of filters corresponding to the header policy. For example, the filter configuration logic 32 may configure upper traffic filter 33 and lower traffic filter 35 if the header policy refers to whether or not to compress/decompress the headers of the IP packets, and whether to output or discard the IP packets after header compression/decompression. The filter configuration logic 32 may configure upper configuration filter 34 and/or lower configuration filter 36 if the header policy refers to how to compress/decompress the headers of the IP packets.

Then, the header compress/decompress framework 101 may receive an IP packet from the frame constructor/extractor 100 or from the network 14 (block 406) and determine whether to compress/decompress a header of the IP packet based upon the header policy (block 407). In response to the header policy indicating that the header of IP packet should be compressed/decompressed, the upper traffic filter 33 may deliver the IP packet to the compress/decompress logic 37 for header compression/decompression with reference to the compression/decompression parameters translated from the header policy (block 408). However, in response to the header policy indicating that the header of the IP packet should not be compressed/decompressed, the upper traffic filter 33 may bypass the compress/decompress logic 37 and output the IP packets without header compression/decompression (block 411).

In block 409, the lower traffic filter 35 may determine whether to output or discard the IP packet after header compression/decompression. For example, the lower traffic filter 35 may determine to discard the IP packet if code error of the IP packet goes beyond a tolerance limit or a computed checksum does not match what the IP packet claims. Based upon the decision, the lower traffic filter 35 may discard the IP packet (block 410) or output the IP packet (block 411).

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. An apparatus for a network, comprising:
   a policy agent to define a header policy for a packet to be transmitted through the network based upon characteristics of the network; and
   a compression logic to compress a header of the packet based upon whether the header policy indicates the header of the packet is to be compressed,
   wherein, the policy agent is further to define another header policy for another packet received through the network based upon at least one of the characteristics of the network, user's preference for header decompression and a predefined rule on header decompression, and wherein the apparatus further comprises a filter to bypass a decompression logic and deliver the another packet to an extractor to extract frames from the another packet without header decompression in response to the another header policy indicating that the header for the another packet is not to be decompressed.

2. The apparatus of claim 1, further comprising:
   a filter to select between delivering the packet to the compression logic and delivering the packet to the network without header compression based upon the header policy.

3. The apparatus of claim 1, further comprising:
   a filter to select between delivering the packet from the compression logic to the network and discarding the packet from the compression logic, based upon the header policy.

4. The apparatus of claim 1, wherein the policy agent is further to generate header compression parameters based upon the header policy for the compression logic to compress the header of the packet.

5. The apparatus of claim 1, wherein the characteristics of the network comprises at least one of network type, bandwidth, information on whether a network device routing the packet transmitted from the apparatus is aware of header compression.

6. The apparatus of claim 1, wherein the policy agent is further to define another header policy for another packet received through the network based upon at least one of the characteristics of the network, user's preference for header decompression and a predefined rule on header decompression.

7. The apparatus of claim 1, further comprises:
   a decompression logic to decompress a header of the another packet based upon whether the another header policy indicates the header for the another packet is to be decompressed.

8. The apparatus of claim 6, further comprising:
   a filter to select between delivering the another packet from the decompress logic to an extractor to extract frames from the another packet and discarding the another packet from the decompress logic, based upon the another header policy.

9. The apparatus of claim 1, wherein the policy agent is further to define the header policy for the packet based upon characteristics of the packet.

10. A method, comprising:
    defining, by a policy maker logic, a header compression policy for a packet to be transmitted through a network based upon user's preference for header compression;
    compressing a header of the packet based upon whether the header policy indicates the header is to be compressed;
    defining another header policy for another packet received through the network based upon user's preference for header decompression;
    decompressing a header of the another packet based upon whether the another header policy indicates the header for the another packet is to be decompressed; and
    selecting between delivering the another packet after header decompression to an extractor to extract frames from the another packet and discarding the another packet after header decompression, based upon the another header policy.

11. The method of claim 10, further comprising:
    delivering the packet to the network without header compression in response to the header policy indicating that the header of the packet is not to be compressed.

12. The method of claim 10, further comprising:
    selecting between delivering the packet after header compression to the network and discarding the packet after header compression, based upon the header policy.

13. The method of claim 10, wherein the compressing further comprises:
    generating header compression parameters based upon the header policy; and
    compressing the header of the packet based upon the header compression parameters.

14. The method of claim 10, further comprising:
defining another header policy for another packet received through the network based upon user's preference for header decompression; and
decompressing a header of the another packet based upon whether the another header policy indicates the header for the another packet is to be decompressed.

15. The method of claim 14, further comprising:
delivering the another packet to an extractor to extract frames from the another packet without header decompression in response to the another header policy indicating that the header for the another packet is not to be decompressed.

16. The method of claim 10, wherein the defining further comprises:
defining the header policy for the packet to be transmitted through the network based upon characteristics of the network.

17. The method of claim 16, wherein the characteristics of the network comprises at least one of network type, bandwidth, information on whether a network device routing the packet transmitted from the apparatus is aware of header compression.

18. The method of claim 10, wherein the defining further comprises:
defining the header compression policy for the packet further based upon a predefined rule on header compression.

19. A computer-readable storage medium comprising a plurality of instructions that in response to being executed result in an apparatus:
defining a header policy for a packet to be transmitted through a network based upon characteristics of the network;
compressing a header of the packet based upon whether the header policy indicates the header is to be compressed;
defining another header policy for another packet received through the network based upon at least one of the characteristics of the network, user's preference for header decompression and predefined rule on header decompression;
decompressing a header of the another packet based upon whether the another header policy indicates the header for the another packet is to be decompressed; and
delivering the another packet to an extractor to extract frames from the another packet without header decompression in response to the another header policy indicating that the header for the another packet is not to be decompressed.

20. The computer-readable storage medium of claim 19, wherein the plurality of instructions further result in the apparatus:
selecting between delivering the packet to a compression logic for header compression and delivering the packet to the network without header compression based upon the header policy.

21. The computer-readable storage medium of claim 19, wherein the plurality of instructions further result in the apparatus:
selecting between delivering the packet after header compression to the network and discarding the packet after header compression, based upon the header policy.

22. The computer-readable storage medium of claim 19, wherein the plurality of instructions further result in the apparatus:
generating header compression parameters based upon the header policy for the compression logic to compress the header of the packet.

23. The computer-readable storage medium of claim 19, wherein the characteristics of the network comprises at least one of network type, bandwidth, information on whether a network device routing the packet transmitted from the apparatus is aware of header compression.

24. The computer-readable storage medium of claim 19, wherein the plurality of instructions further result in the apparatus:
defining another header policy for another packet received through the network based upon at least one of the characteristics of the network, user's preference for header decompression and predefined rule on header decompression.

25. The computer-readable storage medium of claim 19, wherein the plurality of instructions further result in the apparatus:
decompressing a header of the another packet based upon whether the another header policy indicates the header for the another packet is to be decompressed.

26. The computer-readable storage medium of claim 19, wherein the plurality of instructions further result in the apparatus:
selecting between delivering the another packet after header decompression to an extractor to extract frames from the another packet and discarding the another packet after header decompression, based upon the another header policy.

27. The computer-readable storage medium of claim 19, wherein the plurality of instructions that result in the apparatus defining the header compression policy, further result in the apparatus:
defining the header policy further based upon at least one of user's preference for header compression and a predefined rule on header compression.

* * * * *